US011662247B2

(12) United States Patent
Bunner et al.

(10) Patent No.: US 11,662,247 B2
(45) Date of Patent: *May 30, 2023

(54) VEHICLE WHEEL ASSEMBLY HAVING IMPROVED MONITORING CAPABILITIES FOR VARIOUS VEHICLE CONDITIONS AND MONITORING DEVICE FOR ACCOMPLISHING SUCH MONITORING

(71) Applicant: Maxion Wheels U.S.A. LLC, Novi, MI (US)

(72) Inventors: John Evan Bunner, Novi, MI (US); Joseph W. Wolf, Canton, MI (US)

(73) Assignee: Maxion Wheels U.S.A. LLC, Novi, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/689,018

(22) Filed: Mar. 8, 2022

(65) Prior Publication Data

US 2022/0187119 A1 Jun. 16, 2022

Related U.S. Application Data

(63) Continuation of application No. 16/814,011, filed on Mar. 10, 2020, now Pat. No. 11,280,664, which is a
(Continued)

(51) Int. Cl.
*G05D 1/00* (2006.01)
*G01G 19/12* (2006.01)
(Continued)

(52) U.S. Cl.
CPC .............. *G01G 19/12* (2013.01); *B60Q 9/00* (2013.01); *G01M 17/013* (2013.01);
(Continued)

(58) Field of Classification Search
CPC ....... G01G 19/12; B60Q 9/00; G01M 17/013; G05D 1/021; G05D 2201/0213; B60T 7/12; B62D 6/00; G07C 5/0808
(Continued)

(56) References Cited

U.S. PATENT DOCUMENTS 6,940,940 B2 9/2005 Kranz
7,304,416 B2 12/2007 Mullen
(Continued)

FOREIGN PATENT DOCUMENTS

CN 101625305 A 1/2010
CN 102159491 A 8/2011
(Continued)

OTHER PUBLICATIONS

PCT International Search Report and the Written Opinion, Application No. PCT/US2016/051606, dated Dec. 20, 2016.
(Continued)

*Primary Examiner* — Masud Ahmed
(74) *Attorney, Agent, or Firm* — MacMillan, Sobanski & Todd, LLC

(57) ABSTRACT

A monitoring device includes a housing adhered to a drop well of a wheel inside of a vehicle tire. The housing rotates with the wheel. An electrical circuit disposed within the housing. The electrical circuit including a load sensing device disposed within the housing. The load sensing device sensing forces exerted on the wheel. A transceiver coupled to the electrical circuit. The transceiver communicates load data sensed by the load sensing device to components exterior of the wheel.

20 Claims, 5 Drawing Sheets

Related U.S. Application Data continuation of application No. 15/759,559, filed as application No. PCT/US2016/051606 on Sep. 14, 2016, now Pat. No. 10,598,541.

(60) Provisional application No. 62/218,097, filed on Sep. 14, 2015.

(51) Int. Cl.
| | | |
|---|---|---|
| *B60Q 9/00* | (2006.01) | |
| *G01M 17/013* | (2006.01) | |
| *G05D 1/02* | (2020.01) | |
| *B60T 7/12* | (2006.01) | |
| *B62D 6/00* | (2006.01) | |
| *G07C 5/08* | (2006.01) | |

(52) U.S. Cl.
CPC ............... *G05D 1/021* (2013.01); *B60T 7/12* (2013.01); *B62D 6/00* (2013.01); *G05D 2201/0213* (2013.01); *G07C 5/0808* (2013.01)

(58) Field of Classification Search
USPC ...................................................... 701/1, 48
See application file for complete search history.

(56) References Cited

U.S. PATENT DOCUMENTS

| | | | | |
|---|---|---|---|---|
| 7,533,557 B1 * | 5/2009 | Mott | ...................... | G01N 3/303 |
| | | | | 73/12.14 |
| 7,551,069 B2 | 6/2009 | Cohen | | |
| 7,778,741 B2 * | 8/2010 | Rao | ...................... | B60C 23/0408 |
| | | | | 340/440 |
| 8,664,833 B2 | 3/2014 | Ko et al. | | |
| 9,964,428 B2 | 5/2018 | Petronek | | |
| 2005/0285728 A1 | 12/2005 | Tyndall | | |
| 2010/0256874 A1 * | 10/2010 | Carresjo | ............. | B60C 23/0488 |
| | | | | 701/48 |
| 2010/0256946 A1 * | 10/2010 | Carresjo | ............. | B60C 23/0474 |
| | | | | 702/138 |
| 2010/0274441 A1 * | 10/2010 | Carresjo | ............. | G01M 17/013 |
| | | | | 701/31.4 |
| 2010/0274607 A1 * | 10/2010 | Carresjo | ............. | G01M 17/013 |
| | | | | 342/357.34 |
| 2011/0292630 A1 * | 12/2011 | Yamaguchi | ......... | B60C 23/0493 |
| | | | | 361/807 |
| 2012/0123646 A1 * | 5/2012 | Mantini | ............... | B60G 17/019 |
| | | | | 701/48 |
| 2013/0229275 A1 | 9/2013 | Nakatani | | |
| 2014/0070935 A1 | 3/2014 | Wang et al. | | |

FOREIGN PATENT DOCUMENTS

| | | |
|---|---|---|
| DE | 2409230 A1 | 9/1975 |
| DE | 102012001916 A1 | 8/2013 |

OTHER PUBLICATIONS

PCT International Preliminary Report on Patentability, Application No. PCT/US2016/051606, dated Mar. 20, 2018.
Chinese Notification of the First Office Action, Application No. 202010678778.3, dated Dec. 24, 2021.

* cited by examiner

VEHICLE WHEEL ASSEMBLY HAVING IMPROVED MONITORING CAPABILITIES FOR VARIOUS VEHICLE CONDITIONS AND MONITORING DEVICE FOR ACCOMPLISHING SUCH MONITORING

CROSS-REFERENCE TO RELATED APPLICATIONS

This application is a continuation of U.S. Ser. No. 16/814,011, filed Mar. 10, 2020, the disclosures of which are incorporated herein by reference in entirety, which is continuation of U.S. Ser. No. 15/759,559, filed Mar. 13, 2018, now U.S. Pat. No. 10,598,541, issued Mar. 24, 2020, the disclosures of which are incorporated herein by reference in entirety, which claims priority to International Patent Application No. PCT/US16/051606, filed Sep. 14, 2016, the disclosures of which are incorporated herein by reference in entirety, which claims priority to U.S. Provisional Application Ser. No. 62/218,097, filed Sep. 14, 2015, the disclosures of which are incorporated herein by reference in entirety.

BACKGROUND OF THE INVENTION

The present invention relates generally to vehicle wheel assemblies and in particular to a vehicle wheel having improved monitoring capabilities for various vehicle conditions and monitoring device for accomplishing such monitoring.

Full size trucks in addition to heavy duty trucks are subject to weight restrictions when driving along certain traveled roads. Loads in the vehicle may be detected by weight sensors integrated on the truck itself. Such weight sensors, if incorporated on the truck, may be integrated to a fixed frame of the vehicle between the chassis of the vehicle and the bed of the vehicle. These respective load sensors are dedicated to the only sensing the weight in the bed of the truck. Such sensors do not provide other data for other vehicle conditions nor are such sensors designed for sensing other conditions or positioned for sensing other conditions such, weight distribution, temperature, as tire pressure camber of the wheel. Such load conditions as well as other sensed operating conditions can affect how a vehicle system operatively reacts. While the information relating to different operating conditions is useful in controlling vehicle operations, many of the sensed conditions of the vehicle requires a dedicated sensor which is costly and adds packaging complexity.

SUMMARY OF THE INVENTION

The present invention relates to a vehicle wheel having improved monitoring capabilities for various vehicle conditions and monitoring device for accomplishing such monitoring.

According to an embodiment, a feature of the invention is to add functionality to existing wheels by adding a monitoring device or system, including one or more components and associated sensors, to the vehicle wheel. The monitoring device will have the capability to monitor various vehicle conditions, such as for example including but not limited to, wheel clamp load, wheel load, axle load, weight distribution, ambient temperature, wheel temperature, and tire air pressure.

The information obtained by the sensor can be used to by various systems including, but not limited to, TCS, ABS, EBD, AAR, CMBS, AWD, CTIS, tire wear, and damage control reporting. Such systems can utilize this information for countering instability control issues or making adjustments to maintain stability. In addition, such information can be provided to the driver for driver awareness such as overload or uneven loading, unsafe wheel attachment, low tire pressure, or potential rollover.

Furthermore, a feature of the monitoring device is that the device preferably generates sufficient electricity to power itself via one of several technologies that turn kinetic energy into electrical energy. Such energy can be used to drive the electrical components of the sensor directly or can be used as a power source to charge rechargeable power cells.

An embodiment contemplates a monitoring device that includes a housing adhered to a drop well of a wheel inside of a vehicle tire. The housing rotates with the wheel. An electronic circuit is disposed within the housing. The electrical circuit includes a load sensing device disposed within the housing. The load sensing device senses forces exerted on the wheel. A transceiver is coupled to the electrical circuit. The transceiver communicates load data sensed by the load sensing device to components exterior of the wheel.

An embodiment contemplates a monitoring system including a housing adhered to a drop well of a wheel inside of a vehicle tire. The housing rotates with the wheel. An electronic circuit is disposed within the housing. The electrical circuit includes a load sensing device disposed within the housing. The load sensing device senses forces exerted on the wheel. A transceiver is coupled to the electrical circuit. The transceiver communicates load data sensed by the load sensing device to components exterior of the wheel. At least one controller controls a vehicle operation. The at least one controller receives the load data and adjusts a vehicle operation in response to the load data.

Other advantages of this invention will become apparent to those skilled in the art from the following detailed description of the invention and preferred embodiments, when read in light of the accompanying drawings.

DETAILED DESCRIPTION OF THE INVENTION

Figure 1:
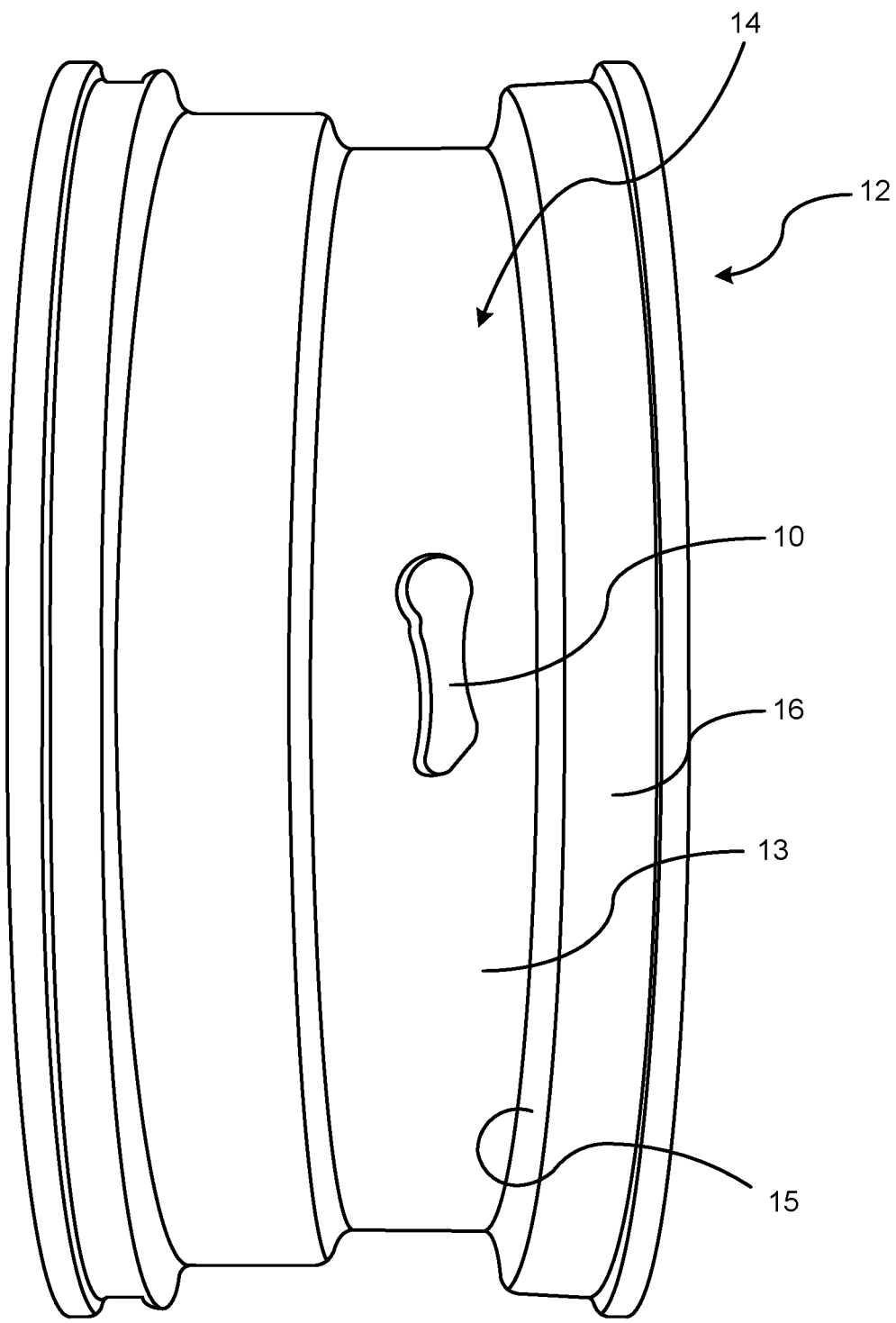
FIG. 1 is a view of a portion of a vehicle wheel having an improved monitoring device configured to be operatively installed thereon in accordance with this invention.

Referring now to the drawings, there is illustrated in FIG. 1 embodiment of a monitoring device, indicated generally at 10, which is configured to be operatively installed on a vehicle wheel 12 in accordance with the present invention. The vehicle wheel 12 may be of any type of construction and/or configuration. In addition, the monitoring device 10 may be installed on any desired location on the vehicle wheel 12, preferably as illustrated as being located in a drop well 13 of an outer side surface 14 of the wheel 12 by suitable techniques including, but not limited to, adhesives, fasteners, or the like. The outer side surface 14 is defined herein as the side of the wheel that is exposed to the inside of the tire for enclosing a chamber to maintain tire pressure. The drop well 13 is defined herein as an axial portion of outer side surface 14 circumferentially formed around the wheel 12 that is adjacent to a rim leg 15 and a bead hump 16. The monitoring device 10, when mounted on the drop well 13 of the outer side surface 14 of the wheel, would be disposed internal within a chamber of a pressurized tire shielded from the external environmental elements.

Figure 2:
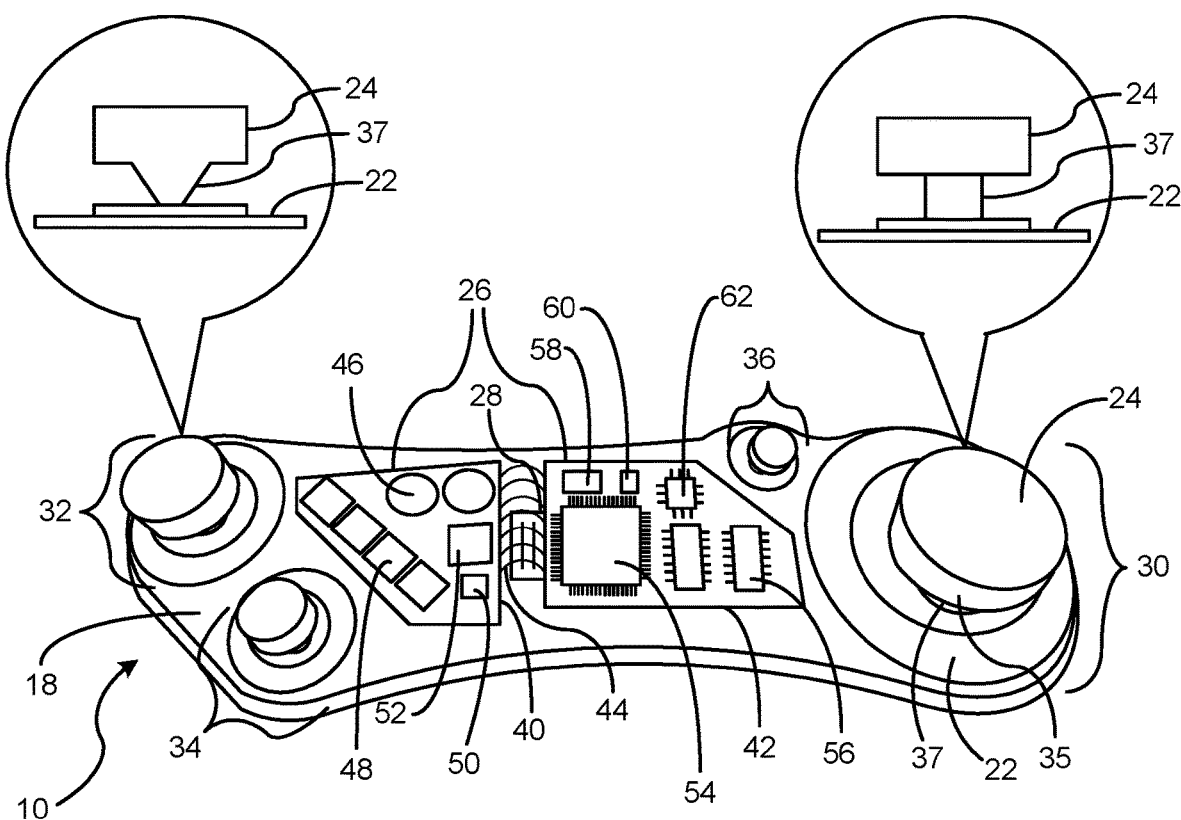
FIG. 2 is a perspective view of a portion of the monitoring sensor illustrated in FIG. 1 showing internal components of the associated monitoring device.
Figure 3:
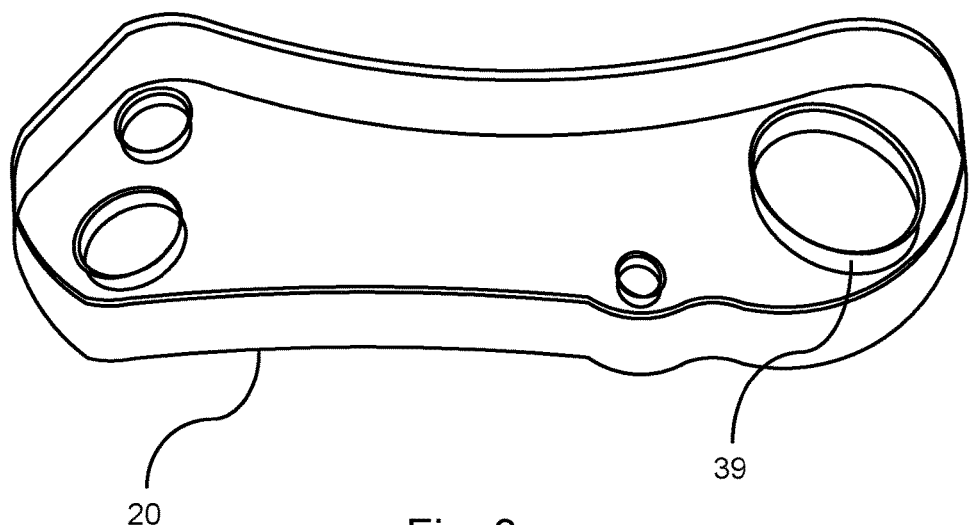
FIG. 3 is a perspective view of a housing cover for the monitoring sensor.

FIG. 2 illustrates the monitoring device 10 (i.e., less a cover) that includes various components for sensing various conditions including, but not limited to, wheel load, wheel clamp load, axle load, weight distribution, camber, impact loads, ambient temperature, wheel temperature, and tire air pressure. A chassis body 18 includes a lower portion of a housing for encasing the various components of the monitoring device 10. A top enclosure or cover 20, as shown in FIG. 3, attaches to the chassis body 18 for sealing the components therein.

Referring again to FIG. 2, the chassis body 18 and the cover 20 are made of a material that can withstand high temperatures and adverse chemicals that can potentially damage electrical components therein. For example, since the monitoring device 10 resides within the tire, sulfuric acid may be emitted from the rubber compound of the tire during operation of the vehicle and deteriorate the electrical components therein if not properly encased. The material used to form the chassis body 18 and the cover 20 may include, but is not limited to, plastic, nylon, or composites.

The components mounted within the monitoring device 10 include, but are not limited to, a plurality of piezo elements 22, a plurality of excitation masses 24, and a printed circuit board (PCB) 26, and a strain gauge 28.

The plurality of piezo elements 22 are used for energy harvesting. It should be understood that while discs are illustrated herein, the piezo elements can be other shapes and configurations including, but not limited to, piezo films. The plurality of piezo elements 22 reacts to pressure, acceleration, strain, temperature, and other forces that generate vibrations on the piezo elements. The vibrations are converted to an electrical charge. Piezoelectric materials that comprise the disc possess crystalline structures. Positive and negative charges of each piezo element 22 do not overlap and therefore yield dipole moments. When the crystalline structure is subjected to mechanical vibrations or motion, a mechanical force or strain is applied to the piezoelectric materials which leads to distortion of the dipoles, thereby creating an electrical charge. The electrical energy can be harvested by storing the energy in power cells, capacitance devices, or may be supplied directly to devices of the monitoring device 10. Other types of energy harvesting that may be utilized include, but are not limited to, a microgenerator and solar energy.

As shown in FIG. 2, a plurality of piezo elements 22 includes discs of different sizes. FIG. 2 illustrates a first piezo element and associated excitation mass 30, a second piezo element and associated excitation mass 32, a third piezo element and associated excitation mass 34, and a fourth piezo element and associated excitation mass 36 that are disposed at various locations around the monitoring sensor 10. It should be understood that the number of associated piezo elements may be more or less than what is shown, and may be located at different locations that what is shown. Frequency limits of piezo elements are typically determined by resonances as set forth by the size and/or shape of the piezo element. Therefore, multiple piezo elements of different sizes are utilized to capture a large bandwidth of the different frequencies that may excite the piezo elements.

To generate vibrations within each piezo element 22, excitation masses 24 are disposed with a center of each piezo element 22. Each of the excitation masses 24 is associated with a respective piezo element. Each excitation mass 24 includes a cylindrical portion 35 supported by a stem portion 37.

Each cylindrical portion 35 is positioned a predetermined height above each piezo element 22. Each stem portion 37 extends through a center of each piezo element 22. An enlarged side view of the piezo element and excitation mass is shown in FIG. 2. It is shown that the stem portion 37 associated with the excitation mass/piezo element 32 are monolithic such that the stem portion 37 and excitation mass 32 are formed as a single component. The stem portion 37 associated with excitation mass/piezo element 32 is tapered. The stem portion 37 tapers as it is mounts within the center of the associated piezo element. This allows for movement of the excitation mass as the wheel rotates which induces vibrations in the associated piezo element. In contrast, stem portion 37 associated with the excitation mass/piezo element 30 is a cylindrical-shaped stem portion. The length and diameter of the cylindrical-shaped stem portion is constructed to allow movement of the excitation mass for inducing vibrations in the associated piezo element. It should be understood that each of the respective excitation masses of the monitoring sensor 10 can use the taper stem portion for all excitation masses, or can use the cylindrical-shaped stem portion for all excitation masses, or can use a combination of both tapered and cylindrical-shaped stem portions. It should also be understood that other shapes and configurations can be used.

As the vehicle wheel rotates along a road of travel, each cylindrical portion 35 of each excitation mass 24 sways in various directions. The stem portion 37 which is coupled to the excitation mass 24 and extends through the center of the piezo element 22 acts on the piezo element 22 thereby generating a force on the piezo element 22. The piezo elements 22 sense the force applied along a neutral axis which generates charge in a respective direction that is perpendicular to the line of force. The sensed excitation is converted to an electrical charge which is harvested by the power components of the PCB 24.

The cover 20 includes walls 39 that align with the plurality of excitation masses 24 when the cover 20 is coupled to the chassis body 18. Each of the walls 39 are shaped similar to a shape of the excitation masses. For example, the excitation masses 24 as shown in FIG. 2 are cylindrical-shaped; therefore, the walls 39 associated with each excitation mass are cylindrical shaped. Each wall 39 is circumferentially larger than a circumference of its associated excitation mass. The function of the walls 39 in the cover 20 is to restrict the excitation masses from displacing too far and damaging the piezo element. As a result, the excitation mass is limited to a predetermined distance that excitation mass is allowed to be displaced.

The PCB 26 includes a power conditioning PCB 40 and a processing PCB 42. The power conditioning PCB 40 and the processing PCB 42 may be a single integrated PCB or may be two or more separate PCBs coupled by a communication medium 44 (e.g., ribbon cable) as illustrated. Two or more separate PCBs may be utilized due to a potential curvature of the chassis body 18. Since the wheel itself is arcuate shaped, it is preferable that the sensor follow the contour of the mounting surface of the drop well on which it is mounted. If the monitoring sensor 10 is flat and the chassis body 18 is arcuate-shaped, the chassis body 18 may have issues seating within a designated seating location of the chassis body 18. Therefore, by utilizing two separate PCBs 40 and 42 that are each smaller than half the length of the chassis body 18, each PCB board may be properly seated within the chassis body 44 despite the chassis body 18 being partially arcuate shaped. If two or more PCBs are utilized, the communication cable 44 is used to communicably couple the PCBs. Alternatively, it should be understood that design alternatives may be made to the chassis body 18 to accommodate a single PCB board that contain the component for both the power conditioning and processing.

The power conditioning PCB 40 controls the energy generation and management of the monitoring device 10. The powering conditioning PCB 40 includes power cells 46, AC/DC converters 48, a DC/DC converter 50, and a power manager 52.

The power cells 46 include an energy storage device including, but is not limited to, battery cells. Such battery cells may include lithium-ion battery which exhibits long life longevity. In addition, other types of batteries including rechargeable batteries may be utilized. Preferably, the power cells are rechargeable and are recharged by the energy harvesting of the piezo elements 22.

The AC-to-DC converter 48 is used as a rectifier to convert energy captured by the piezo elements 22 by harvesting energy vibrations from the piezo elements 22. As set forth earlier, energy harvesting utilizing the piezo elements 22 generates an electrical charge in the form of an alternating current (AC). The AC electrical charge obtained from the vibrations of the piezo elements 22 are rectified by the AC-to-DC converter 48 for producing a direct current (DC) which can be used to recharge the power cells 46 or possibly directly energize a component within the monitoring device 10.

The DC-to-DC converter 50 is an electronic circuit or electromechanical device that converts a source of direct current (DC) from one voltage level to another. The DC-to-DC converter 50 steps up the power level for power consumption by the various devices on the processing PCB 42. Moreover, the DC-to-DC converter 50 may include an inductive charging system where the vehicle's main power source may be used to inductively recharge the power cells 46 or directly power respective devices of the monitoring device 10.

The power manager 52 is an integrated circuit such as a solid state device for managing power requirements by controlling the flow and direction of electrical power. The power manager 52 provides electronic power conversion and/or relevant power control functions. The power manager 52 is enabled to harvest energy from the piezo elements 22 when energy is available. The power manager 52 may further provide power controls such as voltage supervision and undervoltage protection as well as energy management, voltage regulation, charging functions, and dynamic voltage scaling with the use of the DC-to-DC converter 50 to allow dynamic voltage scaling. The power manager 52 may further provide energy in the form of pulse-frequency modulation (PFM) and pulse-width modulation (PWM).

The communication medium 44 electrically couples the power conditioning PCB 40 and the processing PCB 42 to provide power transfer and data transfer between components on the power conditioning PCB 40 and the processing PCB 42.

The processing PCB 42 includes devices such as a central processing unit (CPU) 54, amplifiers 56, accelerometer 58, temperature sensor 60, and transceiver 62.

The CPU 54 is an electronic circuit solid state device that carries out program instructions by performing the various functions including, but not limited to, mathematical functions, logical functions, controls and input/output (I/O) operations specified by its instructions in its operation code. The CPU receives sensing data from the various devices, identifies respective conditions based on the sensing data collected by the various devices and outputs control signals accordingly.

The amplifiers 56 allow different performance level options to be selected. The amplifiers 56 amplify the differential signals prior to being input to the analog-to-digital converter.

The accelerometer 58 measures accelerations of the vehicle and vehicle wheel. Accelerometers are utilized in inertial navigation systems as well as measuring vibration and shock on vehicles (e.g., impact, bumps, and pot holes). The accelerometer 58 may be used to further determine and monitor the camber of the wheels and rotations of the wheels which may assist in determining vehicle acceleration, direction, and speed. In addition to the accelerometer 58, similar devices such as a gyrometer and magnetometer may be used to monitor the various conditions described herein. Furthermore, an inclinometer may be incorporated on the vehicle to determine the inclination of the vehicle. The inclinometer is mounted preferably on a bottom flat surface of the chassis of the vehicle. The sensed data by the inclinometer is transmitted to the monitoring device 10. Given the incline data from the inclinometer along with the load data sensed by the monitoring device 10, the monitoring device can determine a center of gravity of the vehicle which can be utilized for various stability control operations.

The temperature sensor 60 is used to measure temperature of the air within the tire which along with the pressure can be used to determine strategies for vehicle handling capabilities.

Other devices that may be mounted on the board include a board mounted pressure sensor for sensing a tire pressure.

The transceiver 62 is a device that includes a transmitter and a receiver sharing common circuitry within a same chip. The transceiver 62 transmits data processed by the CPU 54 to a receiving unit elsewhere in the vehicle for utilizing the data by one or more controllers for enabling various vehicle applications, which will be discussed in detail later.

The strain gauge 28, sensor film, or similar is seated on a bottom inside surface of the chassis body 18. The strain gauge 28 is used to monitor impact loads exerted on the wheel under both a dynamic condition and a static condition. Under a dynamic condition, the vehicle is moving and the strain gauge 28 measures load forces exerted on the wheel as the wheel rotates. The measured loads generate a sinusoidal signal. By measuring and recording the peak of the sinusoidal signal, the load can be determined based on the peak value recorded.

Under a static condition, the location of the monitoring sensor 10 is determined based on monitoring the rotation of the wheel using the accelerometer. Alternatively, a rotary potentiometer may be mounted on used by mounting the rotary potentiometer on either the wheel itself or inside of the monitoring sensor 10. In a test stage, the wheel is rotated one degree at a time and predetermined loads are applied to the wheel. At each degree increment, the loads are recorded given the position of the monitoring device 10. Once in production, the monitoring device's rotational position is identified via the accelerometer 58. The CPU 54 maintains a lookup table or similar for correlating the strain gauge measurements at the respective positions. Based on the correlation data, a respective load is determined.

It should be understood that load data can be used in various ways. For example, a vehicle may be self monitoring for detecting when the load being carried by the vehicle exceeds a predetermined threshold (e.g., weight restrictions set forth by city, state, or federal regulations). In another example, a determination may be made whether the vehicle is front loaded, back loaded, or overloaded. In addition to warning the driver of such a condition, the suspension may be adaptively modified to compensate for the improper loading. Moreover, a different braking strategy may be applied based on the improper loading. In yet another example, in response to single wheel being improperly loaded, the suspension of the improperly loaded wheel may be adaptively adjusted to correct the improper loading of the single wheel.

Figure 4:
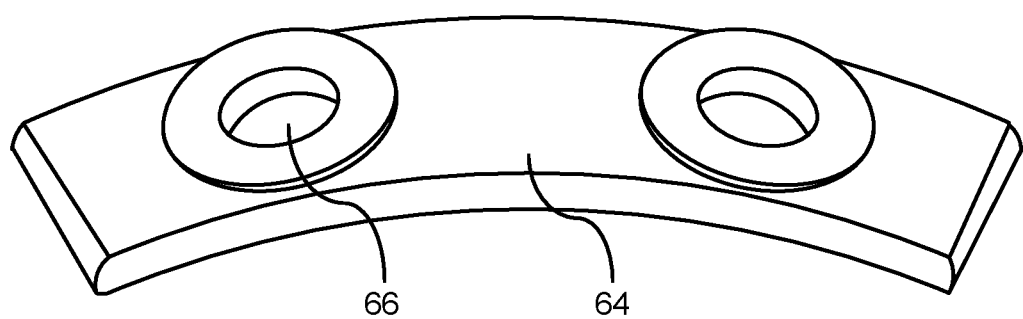
FIG. 4 is a perspective top view of a clamp load spacing device.
Figure 5:
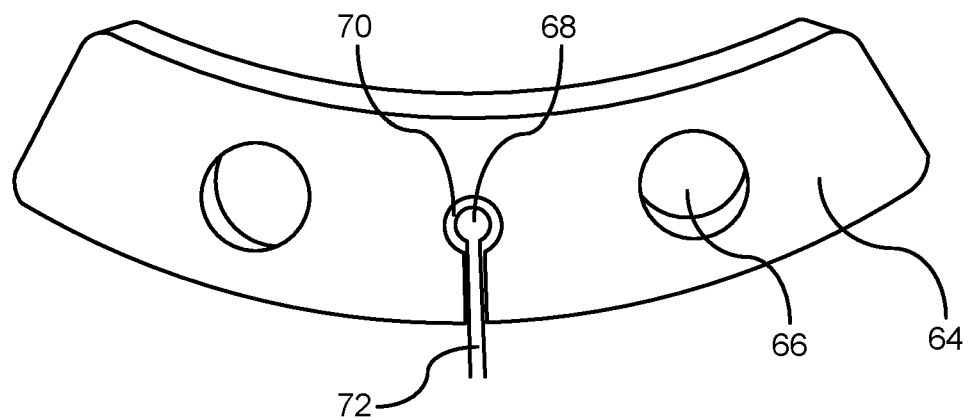
FIG. 5 is a perspective view of bottom surface of a clamp load spacing device.

FIGS. 4 and 5 illustrate a clamp load device used to house a clamp load sensor for determining a clamp load of a wheel. Clamp load occurs when a bolted joint (e.g., the wheel mounting system) tightly clamps two surfaces together. Friction of the two mated surfaces along with a force created from clamping the two surfaces together with bolts allows the surfaces to resist movement. As a result, the amount of friction and clamp load determines a level of resistance of the joint relative to movement. While the clamp load is created by tightening the bolts against the mated surfaces and is normally measured in foot pounds of torque, variations in the clamping of the surfaces caused by rust or lubrication on the threads can affect a clamp load versus a torque relationship. In addition, items disposed between the mated surfaces can reduce the joint's friction and also alter the relationship between clamp load and the torque. To determine a clamp load, a clamp load spacing device 64 is positioned between the wheel and the wheel hub. The clamp load spacing device 64 is arcuately shaped to align with a hub mounting plate of the wheel. The clamp load spacing device 64 includes apertures 66 (i.e., lug nut holes) that align with the lug nut holes of the wheel. The clamp load spacing device 64 may segregated into a plurality of sections as shown where each section is mounted between the wheel and the wheel hub for evenly spacing the wheel when mounted to the wheel hub. Alternatively, the clamp load spacing device 64 may be a single monolithic component formed in a complete circle. The advantage of utilizing a single monolithic spacing device would be for ease of assembly. Alternatively, utilizing separate spacing devices would reduce the service cost should a clamp load sensor need to be replaced, thereby only removing a section.

When the wheel is mounted to a wheel hub, a disk portion of the wheel which lug nut holes of the wheel are disposed is not entirely planar to the wheel hub. Rather, the disk portion is partially flared/conical shaped in a direction toward the wheel hub. As the wheel is mounted on the wheel hub and lug nuts are secured to the lug bolts, the disk portion deforms such that this portion is substantially planar to the wheel hub when the lug nuts are fully secured. As a result, the disk portion enters a loaded state when secured to the wheel hub. In contrast to actually sensing the torque of the lug nuts, a condition is sensed as to whether the disk portion becomes unloaded from its loaded state which indicates that the clamp load is decreasing. To detect a decrease in the clamp load which is indicative of the disk portion transitioning from its loaded state to an unloaded state, a strain or deflection sensor 68 is integrated within the clamp load spacing device 64. FIG. 5 illustrates the strain or deflection sensor 68 integrated within the clamp load spacing device 64. The clamp load spacing device 64 may include a pocket 70 and associated channel 72 in which the sensor 68 and associated wiring is seated. Alternatively, the sensor 68 may be integrally formed as part of the clamp load spacing device 64 using various techniques, such as an over molding technique.

Figure 6:
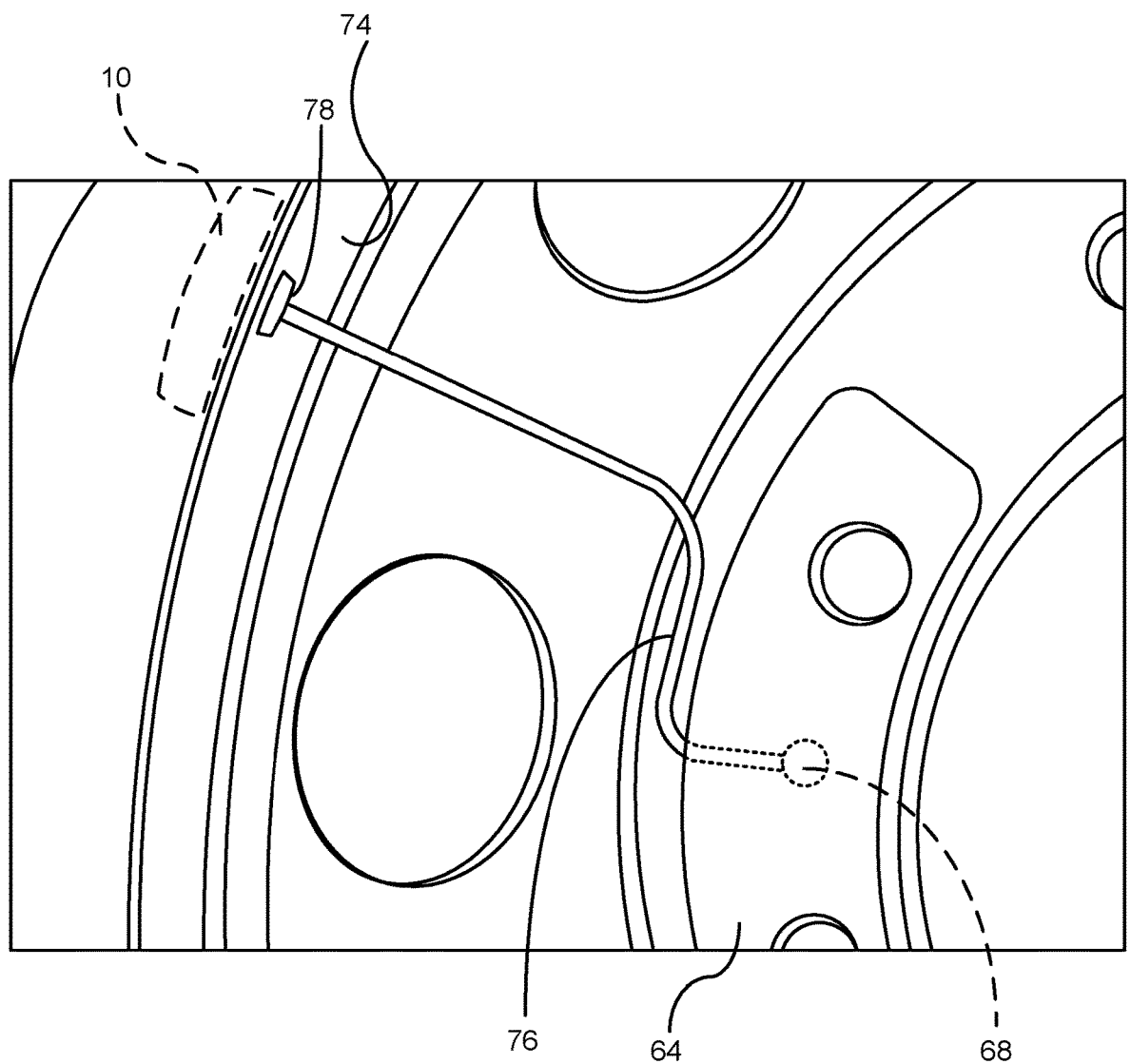
FIG. 6 is a perspective view of a wheel incorporating a clamp load sensor.

FIG. 6 illustrates the sensor 68 and overmolded clamp load spacing device 64 disposed on the hub mounting surface of the wheel. The sensor 68 includes a communication channel 76 that extends from the sensor 68 to an inductive charger unit 78 that is adhered to an inside side surface 74 of the wheel (i.e., near the drop well on the brake side of the wheel rim). The sensor 68 is preferably adhered to the inside side surface of the wheel by an adhesive, however, other processes may be used to fix the sensor to the wheel well. The deflection of the disc portion is monitored by the sensor 68 and is communicated to the monitoring device 10 by the inductive charger unit 70 which is disposed on the opposite wall of the drop well. The inductive charger unit 78 is powered by an electromagnetic induction scheme using contactless energy transfer. A primary induction coil located in the monitoring device 10 energizes a secondary induction coil located in the inductive charger unit 78. The energy received in the secondary induction coil powers the sensor 68. In addition, the inductive charger unit 78 allows message/data signals to be transmitted in both directions with the assistance of the electromagnetic induction. As a result, clamp load data is transmitted from the sensor 68 via the inductive charge unit 70 to the monitoring device 10.

Figure 7:
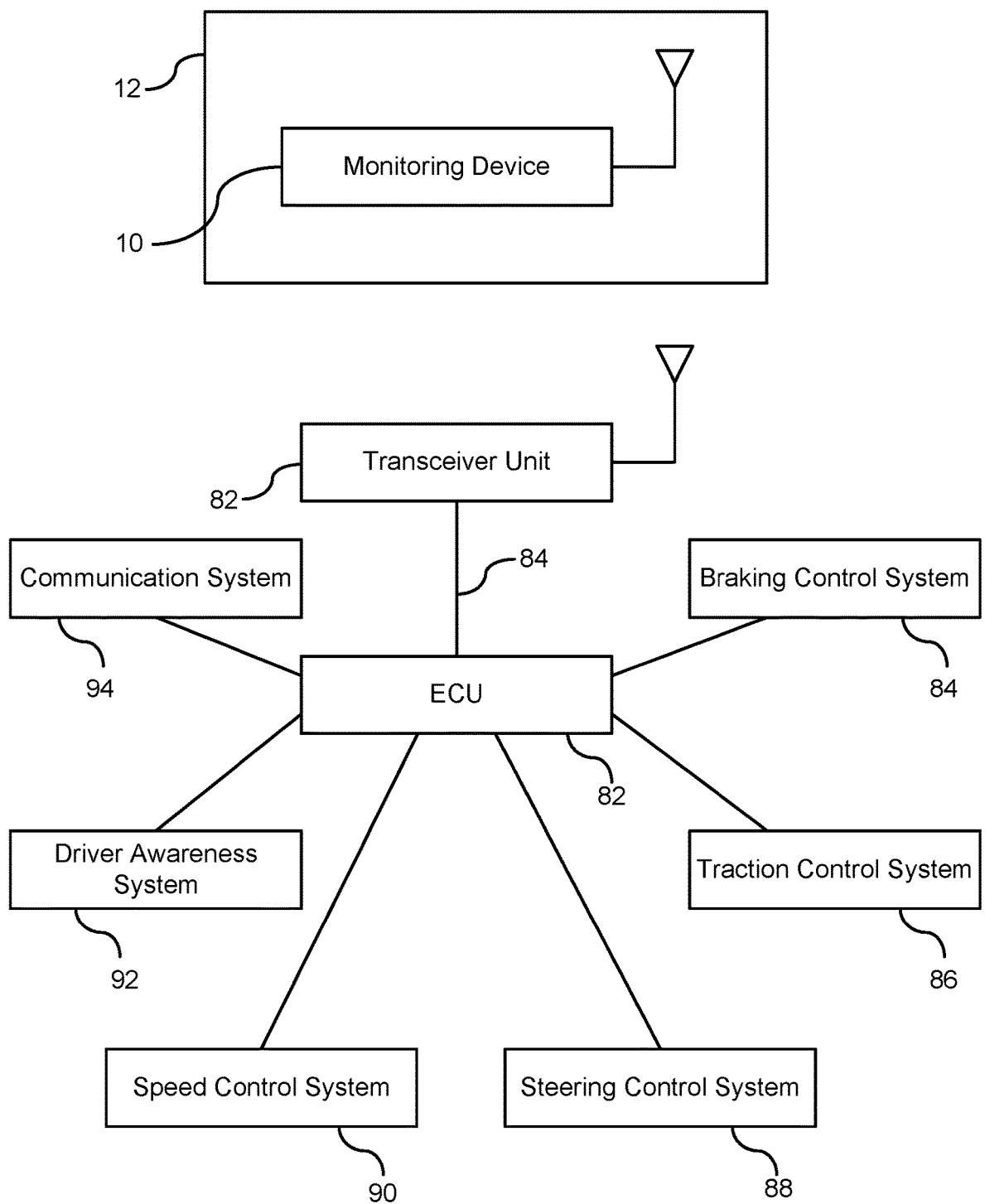
FIG. 7 is a system diagram of the monitoring system within the vehicle.

FIG. 7 illustrates a system diagram for vehicle applications utilizing the data obtained by the monitoring device 10. The monitoring device 10 is retained on the vehicle wheel 12. The monitoring device 10 includes the transceiver which communicates wirelessly with a communication unit 80 that is disposed within the vehicle but exterior of the vehicle wheel 12.

The communication unit 80 is coupled to one or more controllers 82 via a communication bus 84. Preferably, the communication bus 84 is a controller area network (CAN) which is a vehicle bus standard designed to allow microcontrollers and devices to communicate with each other in applications without a host computer. Each controller 82 may be part of the vehicle subsystem or may be used to enable a vehicle subsystem for enabling a vehicle operation. Such subsystems may include braking control systems 84, traction control system 86, steering control systems 88, speed control systems 90, driver awareness systems 92, and communication systems 94. Various data such as vehicle load, vehicle clamp load, center of gravity, camber angle, steering angle, tire pressure, temperature) may be used individually or cooperatively to determine which control system should be enabled as well as the control strategy to be applied by one or more systems. Moreover, data from other sensors or controllers of the vehicle may be used in cooperation with data from the monitoring device 10 to determine control strategies and system enablement.

Braking control systems 84 may be applied autonomously by dynamically applying braking strategies given the sensed condition. Such control systems may include, but are not limited to, anti-lock braking system (ABS), electronic brake-force distribution (EBD), active anti-roll (AAR) system using braking, collision mitigation braking systems (CMBS).

Traction control systems 86 may provide a strategy that distributes power individually to each respective wheel to reduce wheel slip if loading is applied unequally to one or more wheels.

Steering control systems 88 may provide a steering strategy that may be used individually or in combination with braking to provide collision avoidance functionality based sensed data associated with the wheels.

Speed control systems 90 such as adaptive speed control can be enabled based on loading of the vehicle wheels where it is determined that excessive speeds may result in stability issues bases on the sensed loads.

Driver awareness systems 92 may be utilized to provide warnings to a driver of the vehicle concerning conditions such as improper loading or when a decrease in the clamp load is detected. Such warnings to the driver may include visual warnings, audible warnings, and haptic warnings. The device outputting the alert to the driver may be a vehicle based device or may be a non-vehicle based device (e.g., a smart phone, tablet, computer)

The communication system 94 may allow communication to and from the vehicle with another vehicle (V2V), another entity (V2X), or a cloud service. Such data communicated to a cloud service may include vehicle impact data that provides details about a road of travel. For example, carrier entities as well as vehicle insurance companies may utilize the impact data for determining a condition of a road. Carrier companies if hauling fragile goods may utilize the data in determining whether the road of travel is adequate for hauling certain types of goods. Insurance companies may provide recommendations to customers as to which road to avoid for preventing damage to a vehicle, such as a potential for bent wheels if pot holes are present.

The principle and mode of operation of this invention have been described in its various embodiments. However, it should be noted that this invention may be practiced otherwise than as specifically illustrated and described without departing from its scope.

What is claimed is:

1. A monitoring device comprising:
a housing configured to be secured to an outer side surface of a wheel rim of a vehicle wheel inside of a vehicle tire, the housing rotating with the vehicle wheel;
an electrical circuit configured to be disposed within the housing; and
a transceiver coupled to the electrical circuit configured to communicate data to one or more components exterior of the vehicle wheel; and
a clamp load spacing device for monitoring a clamp load of the vehicle wheel, the clamp load spacing device configured to be secured between a disk portion of the vehicle wheel and a wheel hub when the wheel is mounted to the wheel hub, the clamp load spacing device configured to sense whether the disk portion of the vehicle wheel becomes unloaded from a loaded state which indicates that the clamp load is decreasing to indicate that the disk portion is transitioning from the loaded state to the unloaded state;
wherein signals relating to clamp load data as sensed by the clamp load spacing device are transmitted to the electrical circuit to indicate whether the wheel is in the loaded state or is decreasing to indicate that the disk portion is transitioning from the loaded state to the unloaded state.

2. The monitoring device of claim 1 wherein the clamp load spacing device is segregated into a plurality of sections or is a single monolithic component formed in a complete circle, wherein each section or the single monolithic component is mounted between the wheel disk and the wheel hub for evenly spacing the vehicle wheel when mounted to the wheel hub.

3. The monitoring device of claim 1 wherein to detect a decrease in the clamp load which is indicative of the disk portion transitioning from the loaded state to the unloaded state, a strain or deflection sensor is integrated within the clamp load spacing device.

4. The monitoring device of claim 3 wherein the strain or deflection sensor integrated within the clamp load spacing device.

5. The monitoring device of claim 3 wherein the clamp load spacing device includes a pocket and associated channel in which the strain or deflection sensor and associated wiring is seated.

6. The monitoring device of claim 3 wherein the strain or deflection sensor is integrally formed as part of the clamp load spacing device.

7. The monitoring device of claim 6 wherein the strain or deflection sensor is integrally formed as part of the clamp load spacing device by an over molding technique.

8. The monitoring device of claim 3 wherein the strain or deflection sensor includes a communication channel that extends from the strain or deflection sensor to an inductive charger unit that is configured to be secured to an inside side surface of the vehicle wheel.

9. The monitoring device of claim 8 wherein the strain or deflection sensor is secured to the outer side surface of the wheel rim of the vehicle wheel by an adhesive.

10. The monitoring device of claim 1 wherein the electrical circuit further includes a primary induction unit, wherein the primary induction unit energizes a secondary induction unit exposed exterior to the housing, wherein secondary induction unit powers the clamp load spacing device monitoring a clamp load of the wheel secured to a wheel hub, wherein the signals relating to clamp load data as sensed by the clamp load spacing device is transmitted to the electrical circuit via the electromagnetic induction between the secondary induction unit and the primary induction unit.

11. The monitoring device of claim 1 wherein the transceiver is in communication with at least one controller within the vehicle, the transceiver communicating data to the controller, the controller autonomously enabling a vehicle operation in response to a determined load.

12. The monitoring device of claim 1 wherein the transceiver communicates load data to a controller for countering an improper load condition.

13. The monitoring device of claim 1 wherein the transceiver communicates data to a driver awareness system to alert the driver of an improper load condition.

14. The monitoring device of claim 1 wherein the transceiver communicates data to a vehicle communication system, wherein the vehicle communication system communicates data to a cloud service.

15. The monitoring device of claim 14, wherein the data communicated from the vehicle to the cloud service includes impact load data relating to a condition of a vehicle road.

16. The monitoring device of claim 1 wherein the transceiver communicates data including information relating to damage of the vehicle wheel.

17. The monitoring device of claim 1 wherein the transceiver communicates data including information relating to camber of the vehicle wheel.

18. The monitoring device of claim 1 wherein data sensed by the electrical circuit is provided to a braking system to counter vehicle instability via the braking system, or is provided to a traction control system to counter vehicle instability via the traction control system, or is provided to anti-roll stability system to counter vehicle instability via the anti-roll stability system, or is provided to a speed control system to counter vehicle instability via the speed control system, or is provided to an active suspension system to counter the improper loading condition.

19. A monitoring device comprising:
a housing configured to be secured to an outer side surface of a wheel rim of a vehicle wheel inside of a vehicle tire, the housing rotating with the vehicle wheel;
an electrical circuit configured to be disposed within the housing; and
a transceiver coupled to the electrical circuit configured to communicate data to one or more components exterior of the vehicle wheel; and
a clamp load spacing device for monitoring a clamp load of the wheel, the clamp load spacing device configured to be secured between a disk portion of the vehicle wheel and a wheel hub when the wheel is mounted to the wheel hub, the clamp load spacing device configured to sense whether the disk portion of the vehicle wheel becomes unloaded from a loaded state which indicates that the clamp load is decreasing to indicate that the disk portion is transitioning from the loaded state to the unloaded state, the clamp load spacing device being generally arcuately shaped and including apertures that are configured to align with lug nut holes provided in the disk portion and the wheel hub;
wherein signals relating to clamp load data as sensed by the clamp load spacing device are transmitted to the electrical circuit to indicate whether the wheel is in the loaded state or is decreasing to indicate that the disk portion is transitioning from the loaded state to the unloaded state;
wherein the clamp load spacing device is segregated into a plurality of sections or is a single monolithic component formed in a complete circle, wherein each section or the single monolithic component is mounted between the wheel disk and the wheel hub for evenly spacing the vehicle wheel when mounted to the wheel hub;
wherein to detect a decrease in the clamp load which is indicative of the disk portion transitioning from the loaded state to the unloaded state, a strain or deflection sensor is integrated within the clamp load spacing device.

20. The monitoring device of claim 19 wherein the electrical circuit further includes a primary induction unit, wherein the primary induction unit energizes a secondary induction unit exposed exterior to the housing, wherein secondary induction unit powers the clamp load spacing device monitoring a clamp load of the vehicle wheel secured to a wheel hub, wherein the signals relating to clamp load data as sensed by the clamp load spacing device is transmitted to the electrical circuit via the electromagnetic induction between the secondary induction unit and the primary induction unit.

* * * * *